United States Patent
Romana et al.

(10) Patent No.: US 11,816,024 B2
(45) Date of Patent: Nov. 14, 2023

(54) METHOD OF TESTING A SYSTEM MODEL

(71) Applicants: AIRBUS OPERATIONS LIMITED, Bristol (GB); AIRBUS OPERATIONS (S.A.S.), Toulouse (FR)

(72) Inventors: Louis-Emmanuel Romana, Toulouse (FR); George Howell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 113 days.

(21) Appl. No.: 17/586,913

(22) Filed: Jan. 28, 2022

(65) Prior Publication Data
US 2022/0245063 A1    Aug. 4, 2022

(30) Foreign Application Priority Data
Jan. 29, 2021  (GB) .................................... 2101298

(51) Int. Cl.
*G06F 11/36*    (2006.01)
(52) U.S. Cl.
CPC ...... *G06F 11/3692* (2013.01); *G06F 11/3684* (2013.01); *G06F 11/3688* (2013.01)
(58) Field of Classification Search
None
See application file for complete search history.

(56) References Cited

U.S. PATENT DOCUMENTS

| 6,208,955 | B1 | 3/2001 | Provan et al. |
| 2010/0223029 | A1 | 9/2010 | Krog |
| 2011/0224952 | A1 | 9/2011 | Marasco et al. |

(Continued)

FOREIGN PATENT DOCUMENTS

| CA | 3020762 C | * 1/2023 | .............. F24F 11/30 |
| CN | 108 196 141 | 6/2018 | |

(Continued)

OTHER PUBLICATIONS

Extended European Search Report for Application No. EP 21214627.8, dated Jun. 3, 2022.

(Continued)

*Primary Examiner* — Philip Wang
(74) *Attorney, Agent, or Firm* — Nixon & Vanderhye P.C.

(57) ABSTRACT

A method of testing a system model is disclosed. The system model includes a system parameter and three or more equipment models, each equipment model includes an equipment parameter which models a parameter of a respective equipment. The method includes (a) making a series of changes of the equipment parameter of one of the equipment models so that the equipment parameter of the one of the equipment models adopts a series of test values of the equipment parameter; (b) operating the system model to determine a series of test values of the system parameter, each test value of the system parameter is determined in accordance with a respective one of the test values of the equipment parameter; (c) determining a weight of the selected one of the equipment models, the weight of the one of the equipment models indicates a sensitivity of the system parameter to the series of changes in the equipment parameter of the one of the equipment models; and (d) outputting the weight of the one of the equipment models.

13 Claims, 8 Drawing Sheets

(56) References Cited

U.S. PATENT DOCUMENTS

| | | | | |
|---|---|---|---|---|
| 2015/0106346 A1* | 4/2015 | Grove | ............... | G06F 16/219 |
| | | | | 707/695 |
| 2018/0137227 A1* | 5/2018 | Ishii | ............... | G06F 30/13 |
| 2020/0122656 A1* | 4/2020 | Dixit | ............... | B60R 16/0234 |
| 2020/0356087 A1* | 11/2020 | Elbsat | ............... | G05B 23/0254 |

FOREIGN PATENT DOCUMENTS

| | | | | |
|---|---|---|---|---|
| CN | 111 143 981 | | 5/2020 | |
| EP | 4036018 A1 * | 8/2022 | ......... | G06F 11/3684 |
| FR | 2 990 192 | | 11/2013 | |
| KR | 102230468 B1 * | 3/2021 | | |
| WO | WO-2021026370 A1 * | 2/2021 | ......... | G05B 19/0428 |

OTHER PUBLICATIONS

De Nicola et al., "Model-based functional verification & validation of complex train control systems: an on-board system testing case-study", ResearchGate, Jan. 2005, 13 pages.

Search Report for GB2101298.4 dated Jun. 22, 2021, 4 pages.

\* cited by examiner

METHOD OF TESTING A SYSTEM MODEL

CROSS RELATED APPLICATION

This application claims priority to United Kingdom Patent Application GB2101298.4, filed Jan. 29, 2021, the entire contents of which is hereby incorporated by reference.

FIELD OF THE INVENTION

The present invention relates to a method of testing a system model, and a software test bench configured to perform such a method.

BACKGROUND OF THE INVENTION

Complex systems, such as aircraft, are made up of many interlinked and interdependent subsystems and equipment. Each piece of equipment must be compliant with certain requirements associated with safety and/or performance. An example of such a piece of equipment may be a particular valve, a tyre, or an actuator. In addition, each subsystem and the complex system as a whole each have their own requirements associated with safety and/or performance. An example of a subsystem may be a landing gear subsystem, or a control surface subsystem.

As complex systems become more complicated so has verification of each equipment, subsystem, and complex system as a whole. The interfaces and influences of each equipment on the behaviour of other equipment, subsystem, and the complex system as a whole have become more numerous and difficult to predict as more components are added to the complex system. As a result, there are relationships between equipment features and system requirements that are not obvious and cannot be predicted ahead of time. To continue a known method of only testing system requirements that are "known" to be impacted by equipment changes raises the risk that deviations to system performance or functionality may be missed. Alternatively, simply testing all system requirements whenever there is any equipment change drives enormous cost and schedule burden into system development.

There is a need to reduce this burden and to understand how the complex interactions and relationships between equipment, and subsystem, affects other requirements of equipment, subsystem, and the complex system as a whole.

SUMMARY OF THE INVENTION

A first aspect of the invention provides a method of testing a system model, the system model comprising a system parameter and three or more equipment models, wherein each equipment model comprises an equipment parameter which models a parameter of a respective equipment, the method comprising: a. making a series of changes of the equipment parameter of one of the equipment models so that the equipment parameter of the one of the equipment models adopts a series of test values of the equipment parameter; b. operating the system model to determine a series of test values of the system parameter, wherein each test value of the system parameter is determined in accordance with a respective one of the test values of the equipment parameter; c. determining a weight of the selected one of the equipment models, wherein the weight of the one of the equipment models indicates a sensitivity of the system parameter to the series of changes in the equipment parameter of the one of the equipment models; and d. outputting the weight of the one of the equipment models.

Optionally the weight of the selected one of the equipment models is a normalised weight, and the method comprises: determining an un-normalised weight of each of the equipment models; summing the un-normalised weights to obtain a total weight; and determining the normalised weight in step c. in accordance with the un-normalised weight of the selected one of the equipment models and the total weight.

Optionally the system model further comprises a system threshold, and the method further comprises: determining a test metric in accordance with the system threshold and one of the test values of the system parameter, wherein the test metric indicates a degree of compliance of the one of the test values of the system parameter with the system threshold; and outputting the test metric.

Optionally the method further comprises: setting the equipment parameters to respective baseline values; and operating the system model to determine a baseline value of the system parameter, wherein the baseline value of the system parameter is determined in accordance with the baseline values of the equipment parameters.

Optionally the system model further comprising a system threshold, and the method further comprises: determining a baseline metric in accordance with the system threshold and the baseline value of the system parameter, wherein the baseline metric indicates a degree of compliance of the baseline value of the system parameter with the system threshold; and outputting the baseline metric.

Optionally the one of the equipment models further comprises a feature parameter which models a parameter of a respective feature of the equipment, the method comprising: a. making a series of changes of the feature parameter so that the feature parameter adopts a series of test values of the feature parameter; b. operating the system model to determine a series of test values of the system parameter, wherein each test value of the system parameter is determined in accordance with a respective one of the test values of the feature parameter; c. determining a feature weight, wherein the feature weight indicates a sensitivity of the system parameter to the series of changes in the feature parameter; and d. outputting the feature weight.

Optionally the one of the equipment models further comprises a feature parameter which models a parameter of a respective feature of the equipment, the method comprising: a. making a series of changes of the feature parameter so that the feature parameter adopts a series of test values of the feature parameter; b. operating the system model to determine a series of test values of the equipment parameter of the one of the equipment models, wherein each test value of the equipment parameter of the one of the equipment models is determined in accordance with a respective one of the test values of the feature parameter; c. determining a feature weight, wherein the feature weight indicates a sensitivity of the equipment parameter of the one of the equipment models to the series of changes in the feature parameter; and d. outputting the feature weight.

Optionally each equipment parameter models a parameter of a respective equipment of an aircraft.

Optionally outputting comprises displaying.

Optionally steps a.-d. are performed for each of the equipment models.

Optionally steps a. and b. are performed for each of the equipment models, one after the other.

Optionally step a. comprises simultaneously changing multiple equipment parameters; and each test value of the system parameter is determined in step b. in accordance with a respective set of test values of the multiple equipment parameters.

A further aspect of the invention provides a test bench configured to test a system model by a method according to the first aspect of the invention.

BRIEF DESCRIPTION OF THE DRAWINGS

Embodiments of the invention will now be described with reference to the accompanying drawings, in which.

DETAILED DESCRIPTION OF EMBODIMENT(S)

A model-based method can be used to simulate and understand relationships between equipment, and subsystems of a complex system, without the need for extensive real world testing. A model-based method can aid in reducing the required number of tests. However, generally known model-based methods do not focus on providing the evidence that requirements are met, nor on the rationale for why some tests are being performed and not others. Both of these are necessities in a regulated environment, such as an aircraft.

Figure 1:
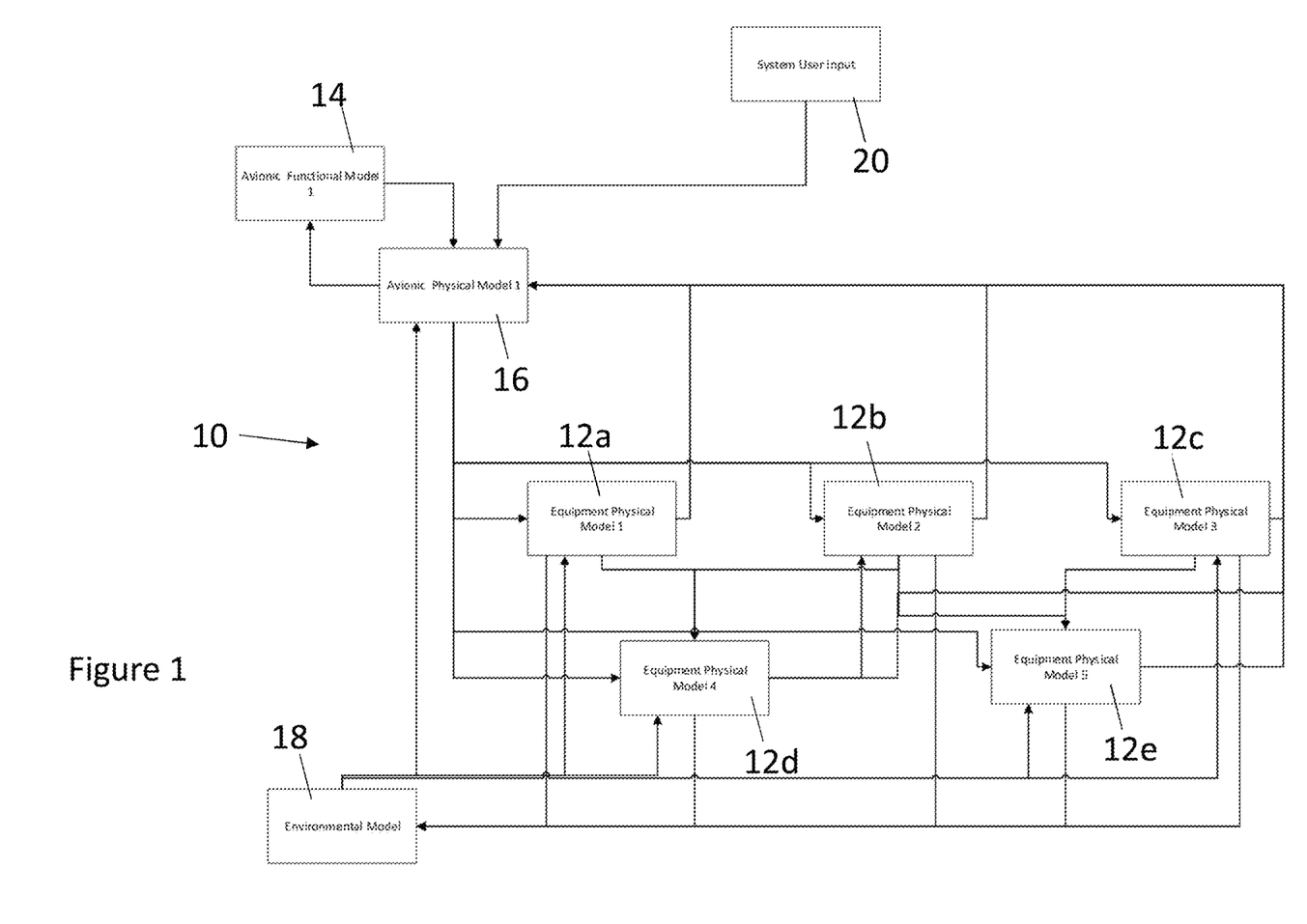
FIG. 1 shows a system model.

FIG. 1 shows a system model 10, which is a model of a complex system such as an aircraft. The complex system model comprises a plurality of sub-models 12a to 12e, 14, 16, 18. The sub-models comprise equipment models 12a to 12e; a subsystem model of a subsystem such as an avionic functional model 14; an avionic physical model 16; and an environmental model 18. The sub-models can be replaced or exchanged if a more accurate model is developed to describe the real-world equipment that the particular sub-model was modelling, or if a new equipment or subsystem is used (either as a trial or a permanent change).

Each equipment model 12a to 12e comprises a set of characteristics. The set of characteristics may consist of a set of equipment features, each equipment feature describing a property of a physical piece of equipment, such as: physical dimensions of the equipment; physical limits of the equipment (e.g. stress, strain, etc); manufacturing tolerances of parts of the equipment; or how the equipment operates (e.g. which parts move and how they move). Alternatively the set of characteristics may consist of a set of equipment requirements of the physical piece of equipment (which can be set by human designers or set via a machine learning tool, etc.). Alternatively, the set of characteristics may comprise a set of equipment features and a set of equipment requirements.

The avionic functional model 14 describes the behaviour of any software or control logic within the system. The avionic functional model 14 can set requirements and limits of the complex system, and define how a user can interact with the complex system though a user input 20. For example, there may be a requirement that landing gear actuators cannot operate at the same time as the landing gear doors are closed—this would lead to the landing gear colliding with the landing gear doors.

The avionic physical model 16 describes physical interactions and signals of the complex system—essentially describing the physical hardware that the complex system operates on. For example, the generation of a signal is not instantaneous, so the signal may have a current transient and definable propagation speed which may affect how an equipment model 12a-12e or other sub-model will respond.

Finally, the complex system may also comprise a subsystem which is modelled by an environmental model 18. The environmental model 18 can define the physics of how the complex model interacts with an environment. For example, this can describe the effect of wind speed and direction on an aircraft wheel, or the effect of temperature on the fluid flow speed of the hydraulics of an aircraft.

The avionic functional model 14 interacts solely with the avionic physical model 16, and the avionic physical model 16 interacts with the equipment models 12a-12e because in the complex system physical signals are interacting with each equipment. Within the system model 10, direct interactions are defined between equipment models 12a-12e which are directly coupled in the complex system, and also between the avionic physical model 16 and each equipment model 12a-12e which can be instructed by the avionic physical model 16. Bidirectional interactions can also occur, specifically between equipment models 12a-12e and the environmental model 18. FIG. 1 shows all of these interactions with just five equipment models 12-12e.

It is important to note that simply because each sub-model may be very well defined and understood, the same is rarely true for the entire system model 10. In fact, this bottom-up knowledge rarely helps explain interactions between sub-models or the behaviour of the system model 10 as a whole. This makes the verification of any changes to the system model 10 very time consuming and difficult due to the safety and performance requirements because a change in one part of the system may unexpectedly affect another (seemingly unrelated) part of the system causing a failure to meet a system requirement of the system model 10, or causing a failure to meet an avionic requirement of the avionic functional model 14.

Figure 2:
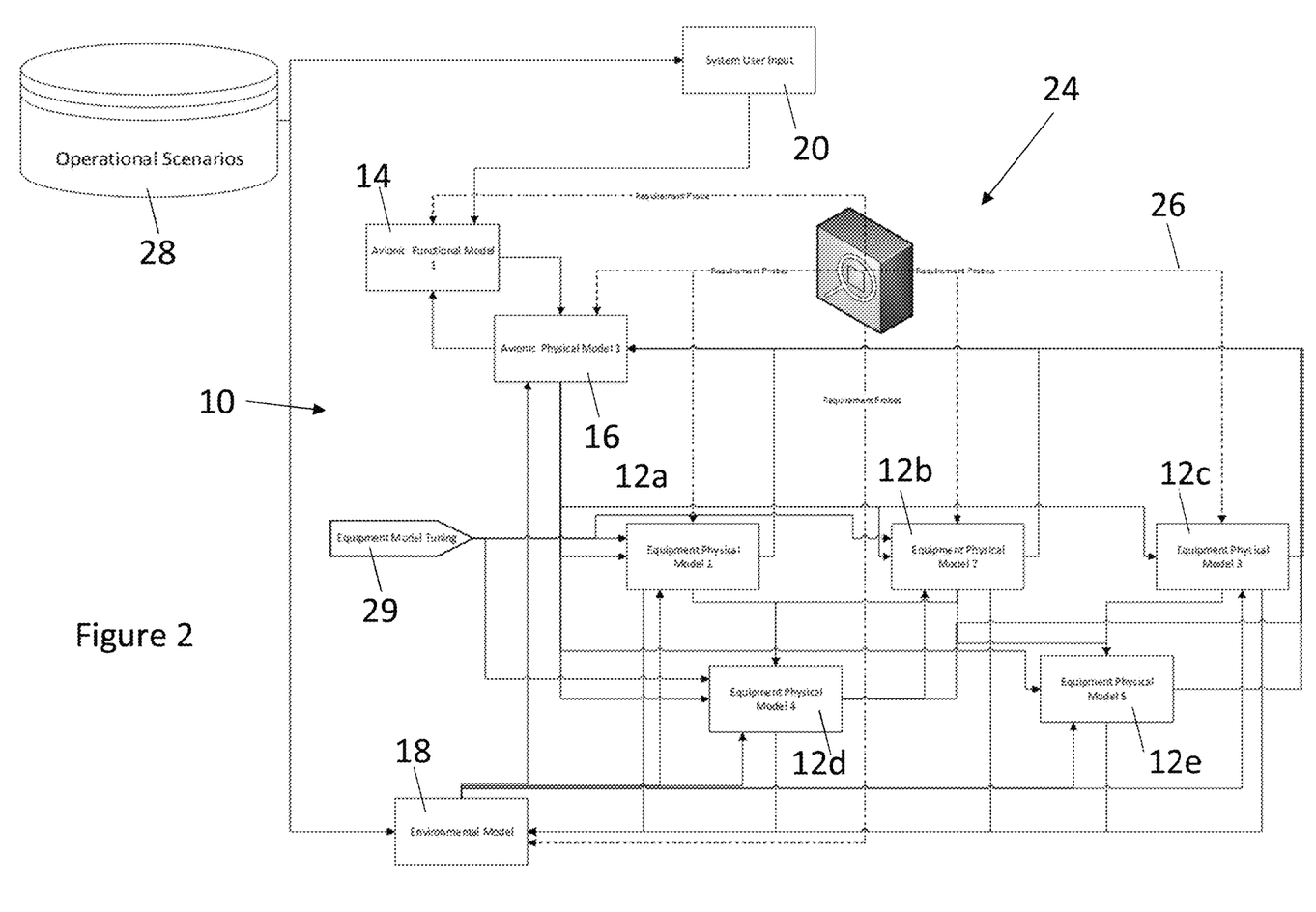
FIG. 2 shows a test bench incorporating the system model of FIG. 1.

FIG. 2 illustrates a test bench 24 for testing the system model 10. The test bench 24 is an environment in which the system model 10 is tested with various software probes. The test bench 24 records and test the relationships between the sub-models of the system model 10.

The test bench 24 comprises a plurality of probes 26. The probes 26 sample each equipment model 12a-12e, and other sub-models 14, 16, 18 to monitor any specific requirements or broader operating requirements. To monitor requirements, probes 26 can measure a compliance status and optionally compliance metrics. The compliance status will monitor if a requirement is met or not met. The compliance metric will monitor more detailed information about how the requirement is met: an actual performance value which, for example, may be a proportion of the requirement. For example, if a requirement is "performance shall be greater than 90%", the probe 26 can confirm whether the 90% threshold is passed and the actual level of performance. These requirements can be set by humans or by the output of a machine learning tool. Multiple probes 26 can be assigned to each equipment model 12a-12e. The avionic functional model 14, the environmental model 18 and the avionic physical model 16 are also probed. Not every requirement or equipment model needs to be probed, however, generally, more data results in better and more accurate results. Probes 26 take a sample every interval of time.

In addition to probes 26, a database 28 of operational scenarios can be supplied as inputs to the avionic functional model 14 (optionally via a system user input 20), and to the environmental model 18, although inputs into other sub-models can also be supplied depending on the system model 10. Each operational scenario is a possible method of operating the system model 10. Each operational scenario can also include knowledge of procedures of how an aircraft is used, this can be a sequence of operations, and/or also include unusual events. For example, one operational scenario can include all of the steps for a standard take-off and landing of an aircraft. In use, each operational scenario may send to the user input 20 all of the steps that a pilot can/will make in performing the operational scenario and also communicate with the environmental model 18 to provide the environmental conditions necessary for that operational scenario (e.g. simulating airflow over control surfaces which provides the lift for take-off).

As the test bench 24 operates the system model 10 under one or more operational scenarios, the probes 26 monitor for breaches of any requirements by measuring compliance status. In addition to simply monitoring for breaches, the probes 26 also monitor a performance value (where appropriate) of a specific requirement to determine how close the value is to breaching a respective requirement, by measuring compliance metrics. For example, if the requirement is that an equipment cannot operate at greater than 100° C., then a probe 26 can quantify how close that equipment was to the requirement, such as 85° C. This performance value requirement may be normalised based on the requirement. Compliance metrics give a greater indication of how each equipment model interacts, and can result in warnings for each equipment model that approaches a requirement in a certain operational condition. This can give an indication that an equipment may need to be re-engineered or replaced. In comparison, a binary verification process, such as the compliance status would only provide an indication that the requirement was passed or not. The use of compliance metrics to assess requirements provides an insight into equipment and sub-system relationships and their relationships to operational scenarios.

The test bench 24 also comprises a verification coverage system, such as an equipment model tuner 29. The equipment model tuner 29 can change a characteristic of the equipment model it is connected to. The equipment model tuner 29 may be connected to each equipment model 12a-12e or only a subset of the equipment models, e.g. 12a, 12b, 12d as shown in FIG. 2.

As mentioned previously each equipment model 12a-12e defines a physical equipment of the complex system, and each physical equipment is manufactured to certain acceptable tolerances. A typical equipment model can be defined to be an idealised physical equipment with characteristics which match the mean average values within each tolerance. Equipment models 12a-12e are defined such that any value for a characteristic which is within a respective tolerance will pass all known functional requirements. However, a certain combination of values for characteristics from one or more equipment models 12a-12e can impact upon requirements for other equipment models 12a-12e and cause a failure to meet a requirement and/or change the compliance metrics corresponding to said requirement. The impact could also be on the avionic functional or system requirements. For example, some combinations of valves' natural frequencies may combine such that the avionics functional model 14 sees wildly oscillating sensor data, causing the avionics functional model 14 to take the wrong action, or causing the system level performance requirements (e.g. aircraft deceleration) to be failed.

The test bench 24 operates the equipment model tuner 29 to change or vary characteristics of equipment models 12a-12e within their tolerances in order to build a database and/or visualisation of the relationships between sub-models and/or their requirements. This can be done is a systematic manner, by changing a single equipment model characteristic, one at a time, while running operational scenarios and using the probes 26 to measure compliance status and compliance metrics compared to the idealised equipment model characteristics. Once this is sufficiently complete, then the test bench 24 can operate the equipment model tuner 29 to change two equipment characteristics, two at a time. This can be done while running operational scenarios and using the probes 26 to measure compliance status and compliance metrics compared to the idealised equipment model characteristics. By changing two equipment characteristics, interrelationships between the two characteristics can be tested. For example, two valves in series may only cause a failure to meet a requirement if both have a specific characteristic. This process can be repeated with three, four, five, or more characteristics being changed. The only limit to the amount of tests which can be done is time, and computing power. It will be appreciated that it would be the most efficient use of resources to vary multiple characteristics of equipment part of the same or directly related sub-systems which are most likely to have an effect on each other. However, this process would only need to be done once for each complex system, and optionally after a change to the complex system. Thus, significantly more resources may be assigned to building an accurate database/visualisation than could be put into a single equipment verification check. This will result in a reduction in all future equipment verification checks associated with changing the complex system model because the database/visualisation can be used to direct the verification process to specific tests which have a strong link to certain requirements.

In addition or as an alternative to varying equipment model characteristics within acceptable tolerances, the equipment model tuner 29 may modify one or more equipment models 12a-12e to simulate: a component failure within the equipment (e.g. a seal failure in a valve); component wear within an equipment; known minor manufacturing defects; and even a change in the equipment model as a whole (e.g. changing a hydraulic actuator to an electrical actuator).

Figure 3:
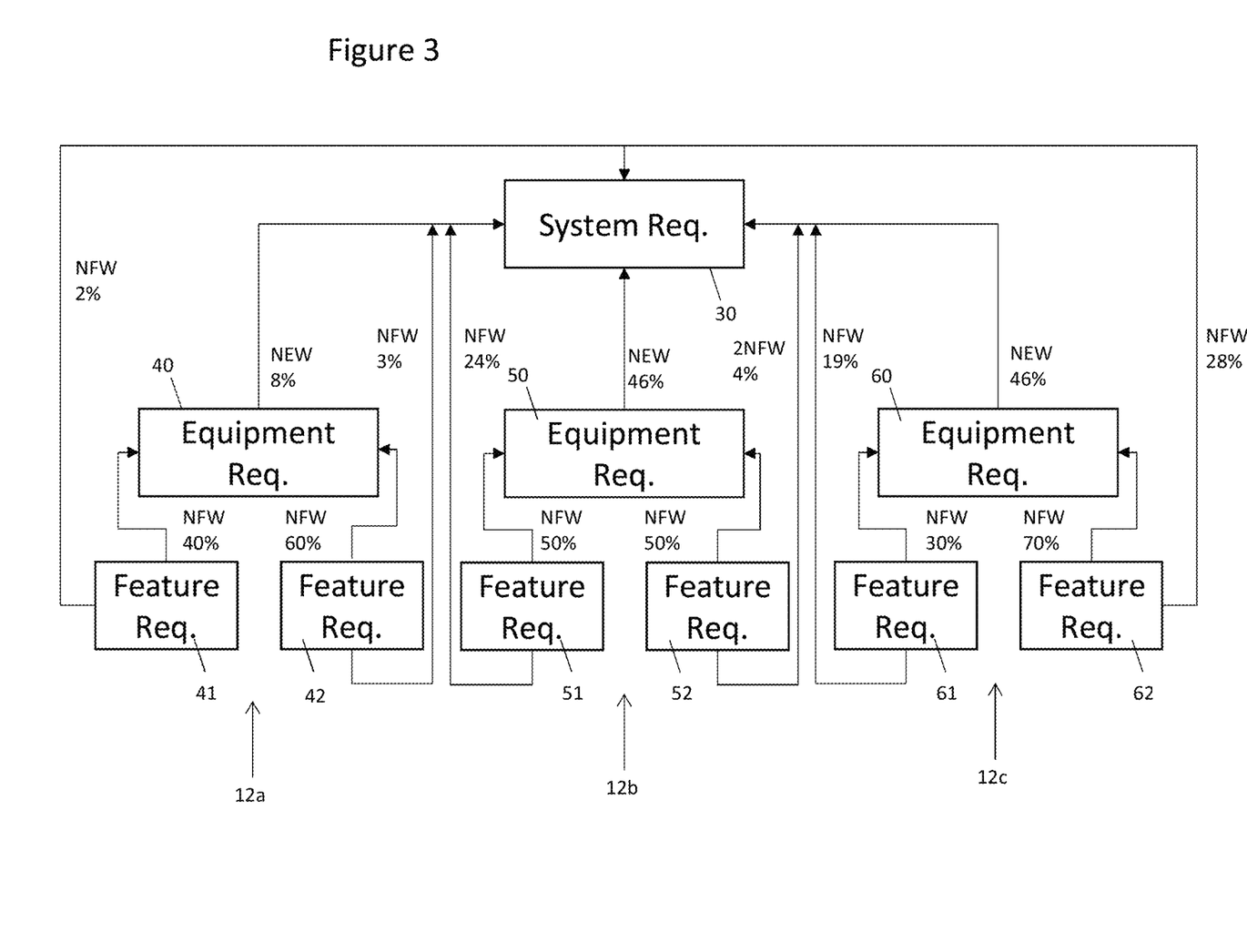
FIG. 3 is a detailed view showing part of the system model.

Through operation of the system model 10 via the test bench 24, the influence of equipment and/or requirement changes on requirements can be measured via the probes 26, and visualised (e.g. using graphs to describe the edge weighting between equipment models and requirements). An example of such a visualisation is shown in FIG. 3. FIG. 3 shows a system requirement 30, and three of the equipment models 12a-c.

The system requirement 30 is "following loss of normal hydraulic power, aircraft shall stop on runway in less than 3300 m". Thus the system requirement 30 has a system parameter (stopping distance) and a system threshold (3300 m). In the example given below, the system parameter has a baseline value of 3200 m.

The first equipment model 12a is associated with a selector valve, and comprises a selector valve equipment requirement 40; a first selector valve feature requirement 41, and a second selector valve feature requirement 42.

The "selector valve equipment requirement 40 is "selector valve leakage shall be below 1 cc/minute". Thus the selector valve equipment requirement 40 has an equipment parameter (selector valve leakage) and an equipment threshold (1 cc/minute). In the example given below, the equipment parameter is set to a baseline value of 0.9 cc/minute.

The first selector valve feature requirement 41 is "gap between sleeve and spool is 10 microns+/−1 micron". Thus the feature requirement 41 has a feature parameter (gap between sleeve and spool), a feature lower threshold (9 microns) and a feature upper threshold (11 microns).

The second selector valve feature requirement 42 is "first stage orifice size is 15 microns+/−2 microns". Thus the feature requirement 42 has a feature parameter (first stage orifice size), a feature lower threshold (13 microns) and a feature upper threshold (17 microns).

The second equipment model 12b is associated with a servo valve, and comprises a servo valve equipment requirement 50; a first selector valve feature requirement 51, and a second selector valve feature requirement 52.

The servo valve equipment requirement 50 is "servo valve leakage shall be below 300 cc/minute". Thus the servo valve equipment requirement 50 has an equipment parameter (servo valve leakage) and an equipment threshold (300 cc/minute). In the example given below, the equipment parameter is set to a baseline value of 290 cc/minute.

The first servo valve feature requirement 51 is "gap between sleeve and spool is 10 microns+/−1 micron". Thus the feature requirement 51 has a feature parameter (gap between sleeve and spool), a feature lower threshold (9 microns) and a feature upper threshold (11 microns).

The second servo valve feature requirement 52 is "first stage orifice size is 15 microns+/−1 micron". Thus the feature requirement 52 has a feature parameter (first stage orifice size), a feature lower threshold (14 microns) and a feature upper threshold (16 microns).

The third equipment model 12c is associated with an accumulator (which acts as a backup power supply) and comprises an accumulator equipment requirement 60; a first accumulator feature requirement 61, and a second accumulator feature requirement 62.

The accumulator equipment requirement 60 is "Backup power supply shall contain 6 litres of fluid, pressurised to 206 bar when filled". Thus the accumulator equipment requirement 60 has an equipment parameter (fluid volume) and an equipment threshold (6 litres). In the example given below, the equipment parameter is set to a baseline value of 6.1 litres.

The first accumulator feature requirement 61 is "vessel shape contains volume of 12.5 litres". Thus the feature requirement 61 has a feature parameter (vessel volume), and a feature value (12.5 litres).

The second accumulator feature requirement 62 is "gas pre-charge is 100 bar+/−1 at 20° C.+/−0.5° C. with no hydraulic fluid". Thus the feature requirement 62 has a feature parameter (gas pre-charge pressure), a feature lower threshold (99 bar) and a feature upper threshold (101 bar).

Each equipment parameter (selector valve leakage, servo valve leakage or power supply volume) may have an impact on the system parameter (aircraft stopping distance). That is, a change in the selector valve leakage may cause a change in the aircraft stopping distance; a change in the servo valve leakage may cause a change in the aircraft stopping distance; and/or a change in the power supply volume may cause a change in the aircraft stopping distance.

Table 1 below gives some examples of how changes in equipment parameters may impact the aircraft stopping distance, compared with a baseline value of 3200 m. Table 1 also shows a metric associated with each value of the equipment parameter.

TABLE 1

| Parameter change | Distance (m) | Change (m) | Percentage change | Metric |
|---|---|---|---|---|
| 0 (baseline) | 3200 | 0 | 0 | 3.0% |
| Selector valve leakage +10% | 3210 | +10 | +0.3% | 2.7% |
| Selector valve leakage −10% | 3200 | 0 | 0% | 3.0% |
| Servo valve leakage +10% | 3295 | 95 | +3% | 0.2% |
| Servo valve leakage −10% | 3150 | −50 | −1.5% | 4.5% |
| Power supply volume +10% | 3200 | 0 | 0% | 3.0% |
| Power supply volume −10% | 3205 | 5 | 0.15% | 2.9% |

So in this example, the aircraft stopping distance is more sensitive to servo valve leakage than to selector valve leakage, so a 10% increase in selector valve leakage causes only a 0.3% increase in stopping distance; whereas a 10% increase in servo valve leakage causes a much higher increase of 3% in stopping distance.

Table 1 includes a baseline metric (3.0%) for the baseline value of 3200 m, and test metrics based on the various test values shown. So for example the test value of 3210 m has a test metric of 2.7%, and the test value of 3150 m has a test metric of 4.5%.

The metrics shown in Table 1 indicate a degree of compliance of the stopping distance with the system threshold (3300 m). Each metric is calculated in accordance with the system threshold (3300 m) and a respective test value. In this example the baseline metric for the baseline value of 3200 m is calculated as (3300−3200)/33=3.0%, the test metric for the test value of 3150 m is calculated as (3300−3150)/33=4.5%, and so on. So in this case because the test value of 3150 m is further away from the threshold than the test value of 3200 m, it has a higher degree of compliance and hence a higher percentage.

Other ways of calculating the metrics may be used—for instance the metrics may be expressed as a percentage of the threshold (for instance 3150/33=95.45%) or an absolute value rather than a percentage (for instance 3300 m−3150 m=150 m).

Figure 4:
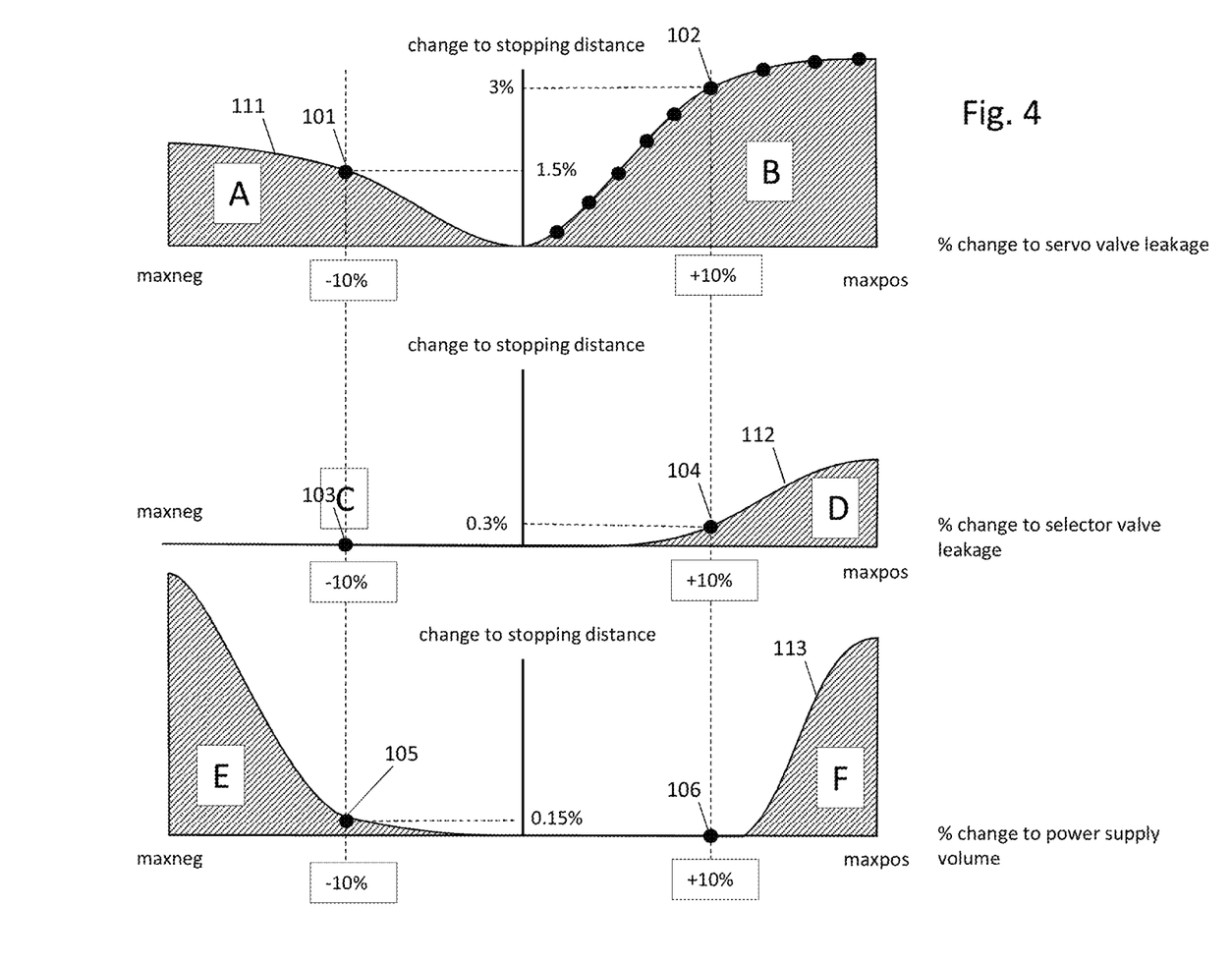
FIG. 4 shows test value curves.

FIG. 4 shows six data points 101-106 on three graphs. The six data points 101-106 correspond with the test values in Table 1. For instance the data point 101 shows the 1.5% change to the stopping distance associated with a −10% change to the servo valve leakage (i.e. a change from a baseline value of 290 cc/minute to a test value of 261 cc/minute); the data point 104 shows the 0.3% change associated with a +10% change to the selector valve leakage (i.e. a change from a baseline value of 0.9 cc/minute to a test value of 0.99 cc/minute); and the data point 105 shows the 0.15% change associated with a −10% change to the power supply volume (i.e. a change from a baseline value of 6.1 litres to a test value of 5.49 litres).

By sweeping through a series of changes of each equipment parameter, the curves 111-113 shown in FIG. 4 are compiled. By way of example, nine data points are shown in which the servo valve leakage is increased in a series of steps, one of the steps being an increase of 10% which provides a 3% increase in stopping distance as indicated in Table 1 and indicated by data point 102.

The area under the servo valve leakage curve 111 is labelled A, B; the area under the selector valve leakage curve 112 is labelled C, D; and the area under the accumulator curve 113 is labelled E, F.

These areas can be defined mathematically as:

$$\int_{maxneg}^{maxpos} (\% \text{ change to system parameter})$$

$$A + B = \int_{maxneg}^{maxpos} (\% \text{ change to landing distance}) \quad d(\% \text{ change to equipment parameter})$$

$$d(\% \text{ change to servo valve leakage})$$

$$C + D = \int_{maxneg}^{maxpos} (\% \text{ change to landing distance})$$

$$d(\% \text{ change to selector valve leakage})$$

$$E + F = \int_{maxneg}^{maxpos} (\% \text{ change to landing distance})$$

$$d(\% \text{ change to power supply volume})$$

where maxpos is the maximum positive change in the equipment parameter, and maxneg is the maximum negative change in the equipment parameter.

Each of these areas defines an un-normalised equipment weight of an associated one of the models 12a-c. So the un-normalised equipment weight for the servo valve is A+B, the un-normalised equipment weight for the selector valve is C+D, and the un-normalised equipment weight for the power supply is E+F.

A normalised equipment weight (NEW) can be defined mathematically as follows:

$$NEW = \frac{\text{Unnormalised Equipment Weight}}{\text{Total Weight}}$$

The normalised equipment weight (NEW) of the servo valve model 12a is:

$$\frac{A + B}{A + B + C + D + E + F}$$

The normalised equipment weight (NEW) of the selector valve model 12b is:

$$\frac{C + D}{A + B + C + D + E + F}$$

The normalised equipment weight (NEW) for the accumulator model 12c is:

$$\frac{E + F}{A + B + C + D + E + F}$$

By way of example, if A=B=900; C+D=150; and E+F=900, then the normalised equipment weights are 46% for the servo valve model 12a; 8% for the selector valve model 12b; and 46% for the accumulator model 12c. The visualisation of FIG. 4 includes these normalised equipment weights (NEWs).

In the example above, only one equipment parameter is varied to calculate the un-normalised equipment weight, but in alternative embodiments two or more equipment parameters may be varied simultaneously. In the simplest case of varying first and second equipment parameters, the areas can be defined mathematically as:

$$\int_{maxneg1, maxneg2}^{maxpos1, maxpos2} (\% \text{ change to system parameter})$$

$$d(\% \text{ change to } EP1) d(\% \text{ change to } EP2)$$

where: % change to EP1 is the % change to the first equipment parameter; % change to EP2 is the % change to the second equipment parameter; maxpos1 is the maximum positive change in the first equipment parameter; maxneg1 is the maximum negative change in the first equipment parameter; maxpos2 is the maximum positive change in the second equipment parameter; and maxneg2 is the maximum negative change in the second equipment parameter.

Thus in these alternative embodiments, multiple equipment parameters are simultaneously changed; and each test value of the system parameter is determined in accordance with a respective set of test values of the multiple equipment parameters.

In the example above, normalised equipment weights (NEWs) are obtained by analysing the sensitivity of the system parameter (aircraft stopping distance) associated with the system requirement 30 to changes in the equipment parameters (selector valve leakage rate, servo valve leakage rate and power supply volume) associated with the equipment requirements 40, 50, 60. The same principals can be used to calculate normalised feature weights (NFWs) by analysing the sensitivity of the system parameter (aircraft stopping distance) associated with the system requirement 30 to changes in the feature parameters (spool size etc.) associated with the features 41, 42, 51, 52, 61, 62.

Feature weights can be defined mathematically as:

$$\int_{maxneg}^{maxpos} (\% \text{ change to system parameter}) \, d(\% \text{ change to feature parameter})$$

The normalised feature weights (NFWs) can be defined mathematically as:

$$NFW = \frac{\text{Feature Weight}}{\text{Total Weight}}$$

where Total Weight is the sum of the feature weights for all equipment features, i.e.:

$$\int_{maxneg}^{maxpos} (\% \text{ change to system parameter}) d(\% \text{ change to feature parameter})$$

Each feature parameter may have an impact on a system parameter (aircraft stopping distance). For example, a change in the feature parameter associated with the feature 41 (selector valve first stage orifice size) may cause a change in the aircraft stopping distance; a change in the feature parameter associated with the feature 51 (servo valve first stage orifice size) may cause a change in the aircraft stopping distance, and so on.

Exemplary normalised feature weights (NFWs) are shown in FIG. 3. For example, the equipment feature 41 (selector valve first stage orifice size) has a normalised feature weight (NFW) of 2% in relation to the system requirement 30 (stopping distance), and the equipment feature 51 (servo valve first stage orifice size) has a normalised feature weight (NFW) of 24% in relation to the system requirement 30 (stopping distance).

In the example above, normalised feature weights (NFWs) are obtained by analysing the sensitivity of the system requirement 30 (aircraft stopping distance) to changes in the feature parameters associated with features 41, 42; 51, 52; 61, 62. The same principals can be used to calculate further normalised feature weights (NFWs) in relation to an equipment requirement 40, 50, 60 by analysing the sensitivity of an equipment parameter (servo valve leakage, selector valve leakage or accumulator volume) associated with one of the equipment requirements 40, 50, 60 to changes in feature parameters (for instance the feature parameters associated with any of the features 41, 42, 51, 52, 61, 62 shown in FIG. 3).

Each feature parameter may have an impact on the equipment parameters (servo valve leakage, selector valve leakage or accumulator volume). For example, a change in the feature parameter associated with feature 41 (selector valve first stage orifice size) may cause a change in the equipment parameter associated with equipment requirement 40 (selector valve leakage); a change in the feature parameter associated with feature 51 (servo valve first stage orifice size) may cause a change in the equipment parameter associated with equipment requirement 50 (servo valve leakage), and so on. Exemplary normalised feature weights (NFWs) are shown in FIG. 3 in relation to the equipment requirements 40, 50, 60. For example, the feature 41 (selector valve first stage orifice size) has a normalised feature weight (NFW) of 40% in relation to the equipment requirement 40 (selector valve leakage), and the feature 51 (servo valve first stage orifice size) has a normalised feature weight (NFW) of 50% in relation to the equipment requirement 50 (servo valve leakage).

The test bench 24 in this example may operate as follows. The equipment model tuner 29 modifies the size of the spool of the servo valve, which impacts the first servo valve feature requirement 51 (which relates to the gap between the sleeve and the spool).

The test bench 24 is then operated to: i) input operational scenarios into the system model 10; and, ii) use the probes 26 to measure compliance status and compliance metrics (a change in the amount that the requirements are met which shows an interrelationship between the modification of the spool and the requirements). The results can be compared to the compliance status and compliance metrics. A change in the compliance metrics in this example show that a modification to the spool size can surprisingly affect the system requirement 30.

The test bench 24 thus checks if the aircraft can still stop within 3300 m, when a change in the spool size takes place. To put it another way, a test is performed to check if the accumulator fluid volume is enough despite extra leakage caused by the spool modification.

The benefit of the above method is that verification time is reduced because there is no need to re-run a lot of unnecessary tests, and there is more efficient use of available equipment because there is no need to over-design for the worst case scenario.

The influence of the modification on requirements can be measured via the probes 26, and visualised (e.g. using graphs to describe the edge weighting between equipment and requirements, or by displaying NEWs and/or NFWs as shown in FIG. 3).

Figure 5:
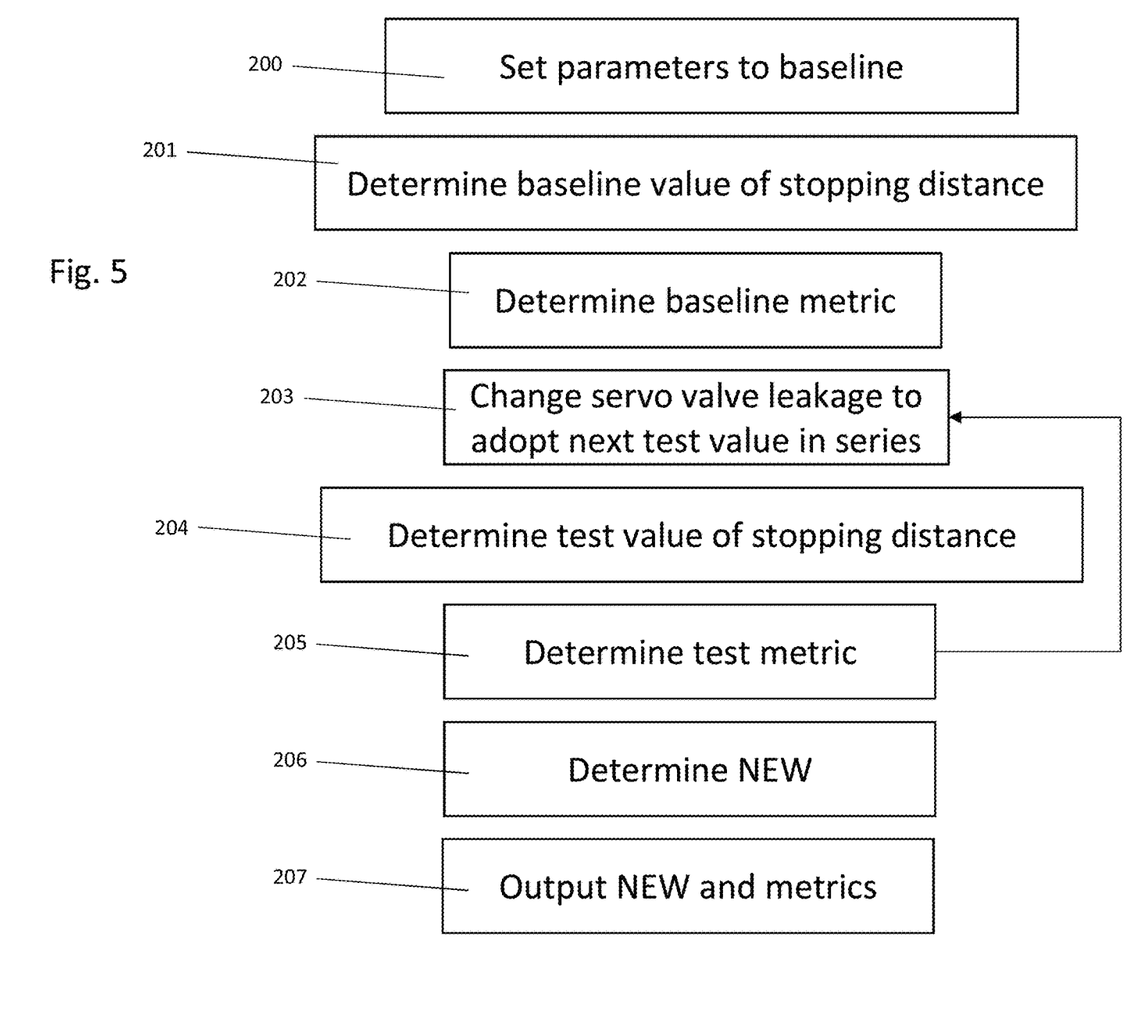
FIG. 5 is a flow diagram giving an example of a first method according to the present invention.

FIG. 5 is a flow chart giving an example of the calculation of the 46% normalised equipment weight (NEW) for the equipment model 12b.

First, the equipment parameters, the features parameters and any other relevant parameters of the system model are set by the test bench 24 to respective baseline values in step 200.

Next the test bench 24 operates the system model 10 in step 201 to determine a baseline value of the stopping distance. The baseline value (in the example above, 3200 m) is determined in accordance with the baseline values of the equipment and feature parameters, and any other relevant parameters.

Next, the baseline metric is determined at step 202 (in the example above, the baseline metric is 3.0%).

Next, the test bench 24 makes a series of changes of the equipment parameter of the equipment model 12a (servo valve leakage) so that the equipment parameter adopts a series of test values; operates the system model to determine a series of test values of the system parameter (stopping distance); and determines a test metric for each test value of the equipment parameter (servo valve leakage).

In this example, the series are generated by repeating steps 203-205. In step 203 the equipment parameter (servo valve leakage) is set by the equipment model tuner 29 to adopt the next test value in the series. In step 204 the probe 26 is operated to determine a test value of the system parameter (stopping distance) in accordance with the current test value of the equipment parameter (servo valve leakage). In step 205 a test metric is determined by the probe 26 in accordance with the system threshold (3300 m) and the current test value of the system parameter (stopping distance). The test metric indicates a degree of compliance of the current test value of the system parameter (stopping distance) with the system threshold (3300 m).

Once the steps 303-305 have been repeated for all test values between maxneg and maxpos, in step 205 the weight is determined by the probe 26 as described above. The weight indicates a sensitivity of the system parameter (stopping distance) to the series of changes in the equipment parameter (servo valve leakage).

Finally in step 207 the metrics are output by the probe 26, along with the weight. The output may be in the form of a display, for example; or storage for later analysis.

FIG. 5 is a flow chart giving an example of the calculation of the 46% normalised equipment weight (NEW) and metrics for the equipment model 12b. This process may be performed one-by-one for some or all of the equipment models of the system model 10. Alternatively the process may be performed for only one of the equipment models.

Figure 6:
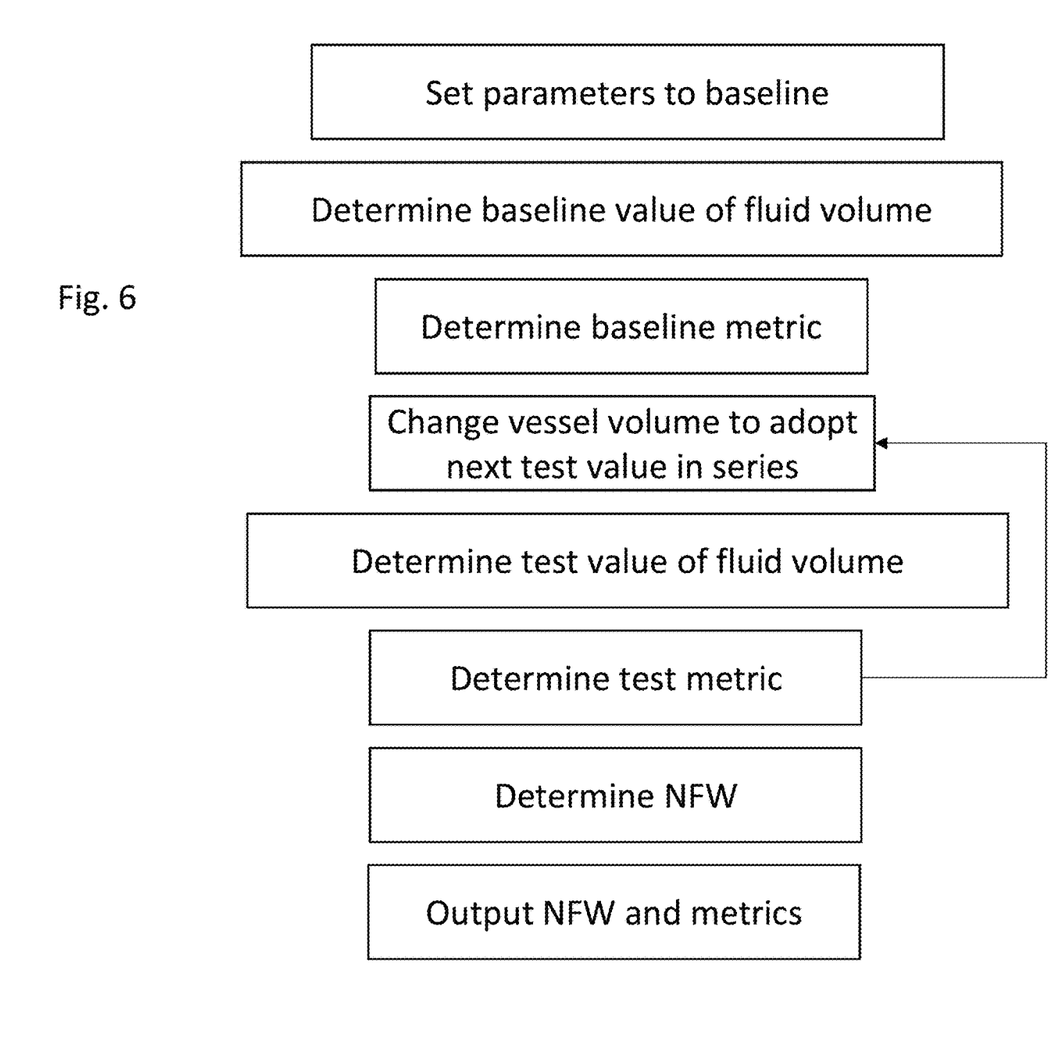
FIG. 6 is a is a flow diagram giving an example of a second method according to the present invention.
Figure 7:
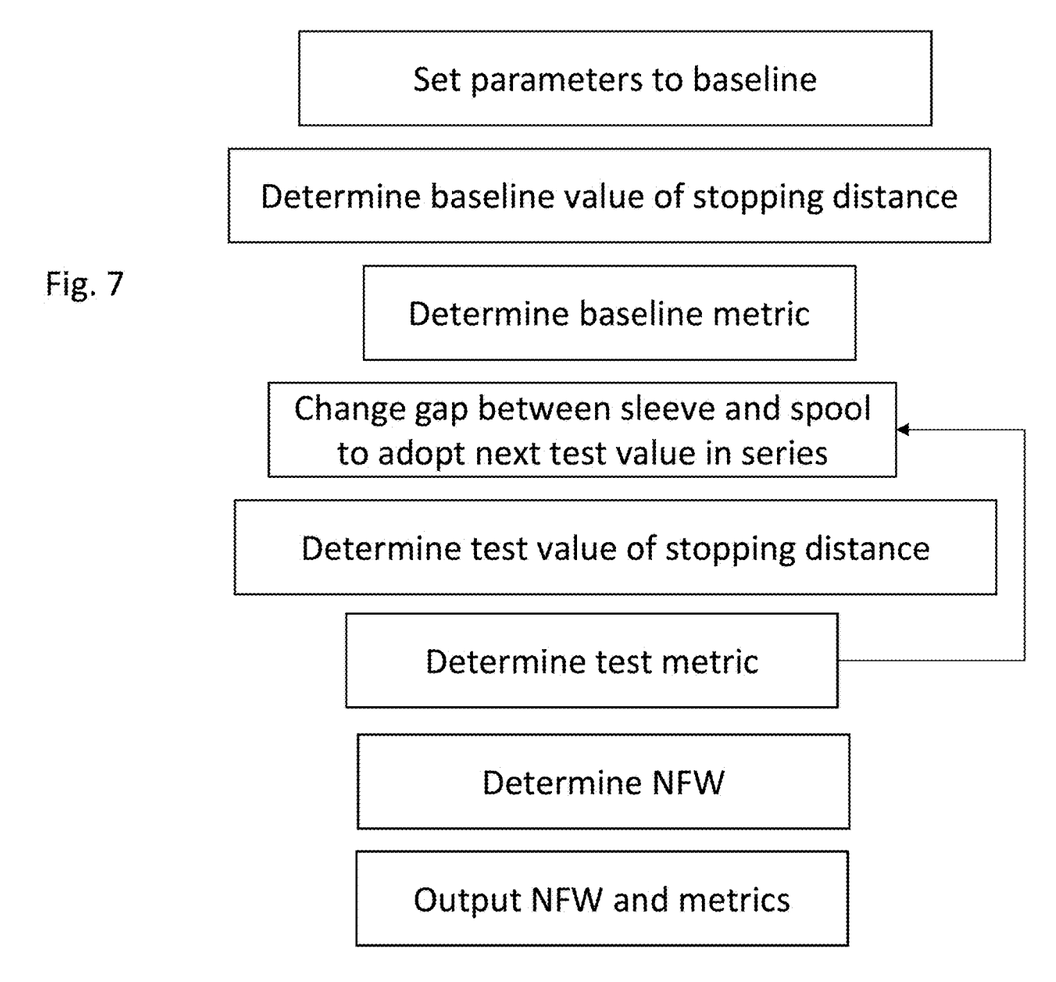
FIG. 7 is a flow diagram giving an example of a third method according to the present invention.

A similar process is shown in FIG. 6 for generating the 30% normalised feature weight (NFW) and metrics for the feature requirement 61 of the equipment model 12c. A similar process is shown in FIG. 7 for generating the 2% normalised feature weight (NFW) and metrics for the feature requirement 41 of the equipment model 12a.

Figure 8:
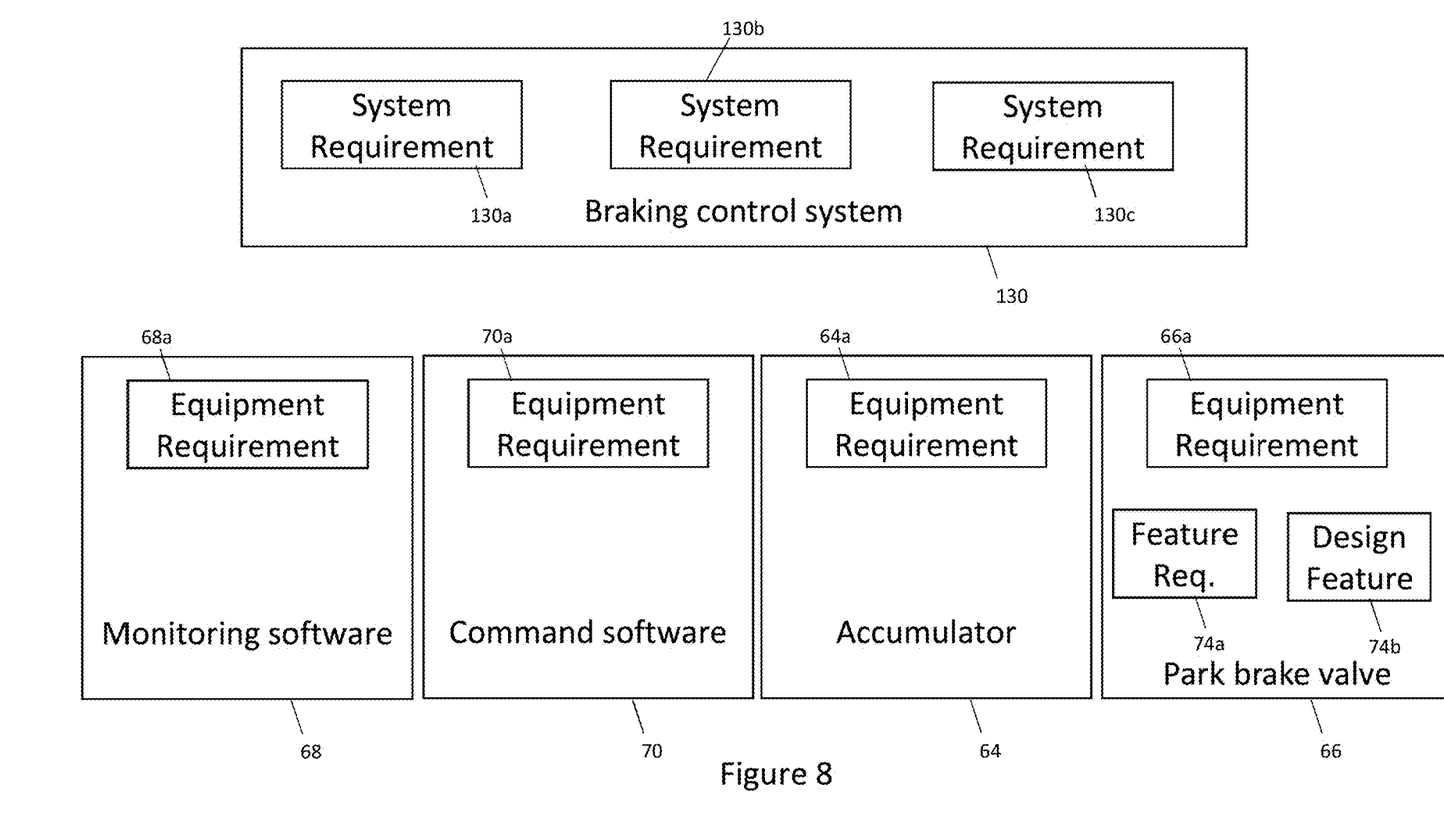
FIG. 8 shows an alternative system model.

A more complex system model is shown in FIG. 8 which can be tested using the methods described above. The system model of FIG. 8 has five sub-models: a braking control system model 130 which models a braking control system; an accumulator model 64 which models an accumulator; a park brake valve model 66 which models a park brake valve; a monitoring software model 68 which models monitoring software; and a command software model 70 which models command software.

The monitoring software model 68 and the command software model 70 may also be defined as elements of the braking control system model 130, however, they are shown as distinct equipment models in this example for clarity.

In this example, the braking control system model 130 has three system requirements: a first system requirement 130a that when the aircraft is unpowered whilst parked, it shall remain stationary with winds up to 100 knots on a runway sloped up to 5 degrees at a mass up to Max Ramp Weight for all centre of gravity positions; a second system requirement 130b that no single failure shall result in uncommanded braking; and a third system requirement 130c that no single failure shall result in a loss of 50% or more braking.

An equipment requirement 68a requires that the monitoring software shall detect uncommanded braking when pressure at brakes is greater than 40 bar and flight crew demand is less than 10 bar.

An equipment requirement 70a requires that the command software shall isolate the active braking valves if uncommanded breaking is detected.

An equipment requirement 64a requires that the accumulator shall deliver at least 20 bar when 10 cc fluid is consumed after being fully filled.

An equipment requirement 66a requires that the park brake valve shall remain in ON position when electrical power is removed.

The park brake valve model 66 also has a feature requirement 74a for a park brake valve component (e.g. a lock to manipulate a spool to activate the park brake). The feature requirement 74a requires that the lock shall hold the spool in place with a force of at least 10 N. The model 66 also comprises a design feature 74b—in this case the equipment design feature 74b defines a size of the lock.

In this example, the equipment model tuner makes a modification to the design feature 74b (the size of the lock) and the test bench is operated to: i) input the operational scenarios to the complex system model; and, ii) use the probes to measure the weight and test metrics. The results can be compared to the baseline values relating to no modification of the lock. A change in this example may show that a modification to the size of the lock can surprisingly cause a loss of 50% or more braking, failing the third system requirement 130c.

It can be seen that a change in the lock size has a large impact on the available force, which can cause erroneous behaviour of the park brake, ultimately leading to a loss of braking on multiple brakes and causing a non-compliance with the requirement to have no single failure to result in a loss of 50% or more braking.

Without knowledge of the interrelationships, a modification to the equipment design feature 74b (the size of the lock) may be made without testing if the park brake valve and known requirements will still meet the safety requirements. Operating the equipment model tuner 29 to sweep the lock tolerances may show that at some point the usual brake pressure (roughly 8 bar) starts to rise, reducing compliance to the requirement that brake pressure shall not exceed 40 bar when flight crew demand is less than 10 bar. If the probes detect that normal brake pressure is 8 bar, but see an increase to 10 bar at the edge of tolerance then the compliance has reduced from 80% to 75%. This can be used to indicate a dependency between the size of the lock and the seemingly unrelated monitoring software requirement 68a.

The metrics of the system model of FIG. 1 or FIG. 8 may all be monitored live. When changing a design feature, an equipment parameter or a feature parameter, any changes to the metrics associated with the equipment requirements or feature requirements may be monitored, even if it is not expected that the metric associated with the system requirement would be affected.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of testing a system model, the system model comprising a system parameter and three or more equipment models, wherein each equipment model comprises an equipment parameter which models a parameter of a respective equipment, the method comprising:
   (a) making a series of changes of the equipment parameter of one of the equipment models so that the equipment parameter of the one of the equipment models adopts a series of test values of the equipment parameter;
   (b) operating the system model to determine a series of test values of the system parameter, wherein each test value of the system parameter is determined in accordance with a respective one of the test values of the equipment parameter;
   (c) determining a weight of the selected one of the equipment models, wherein the weight of the one of the equipment models indicates a sensitivity of the system parameter to the series of changes in the equipment parameter of the one of the equipment models; and
   (d) outputting the weight of the one of the equipment models.

2. A method according to claim 1, wherein the weight of the selected one of the equipment models is a normalised weight, and the method comprises:
   determining an un-normalised weight of each of the equipment models;
   summing the un-normalised weights to obtain a total weight; and
   determining the normalised weight in step (c) in accordance with the un-normalised weight of the selected one of the equipment models and the total weight.

3. A method according to claim 1, wherein the system model further comprises a system threshold, and the method further comprises: determining a test metric in accordance with the system threshold and one of the test values of the system parameter, wherein the test metric indicates a degree of compliance of the one of the test values of the system parameter with the system threshold; and outputting the test metric.

4. A method according to claim 1, further comprising:
   setting the equipment parameters to respective baseline values; and operating the system model to determine a baseline value of the system parameter, wherein the baseline value of the system parameter is determined in accordance with the baseline values of the equipment parameters.

5. A method according to claim 1, wherein the system model further comprising a system threshold, and the method further comprises: determining a baseline metric in accordance with the system threshold and the baseline value of the system parameter, wherein the baseline metric indicates a degree of compliance of the baseline value of the system parameter with the system threshold; and outputting the baseline metric.

6. A method according to claim 1, wherein step (a) comprises simultaneously changing multiple equipment parameters; and each test value of the system parameter is determined in step (b) in accordance with a respective set of test values of the multiple equipment parameters.

7. A method according to claim 1, wherein steps (a)-(d) are performed for each of the equipment models.

8. A method according to claim 1, wherein the one of the equipment models further comprises a feature parameter which models a parameter of a respective feature of the equipment, the method comprising:
 (a) making a series of changes of the feature parameter so that the feature parameter adopts a series of test values of the feature parameter;
 (b) operating the system model to determine a series of test values of the system parameter, wherein each test value of the system parameter is determined in accordance with a respective one of the test values of the feature parameter;
 (c) determining a feature weight, wherein the feature weight indicates a sensitivity of the system parameter to the series of changes in the feature parameter; and
 (d) outputting the feature weight.

9. A method according to claim 1, wherein the one of the equipment models further comprises a feature parameter which models a parameter of a respective feature of the equipment, the method comprising:
 (a) making a series of changes of the feature parameter so that the feature parameter adopts a series of test values of the feature parameter;
 (b) operating the system model to determine a series of test values of the equipment parameter of the one of the equipment models, wherein each test value of the equipment parameter of the one of the equipment models is determined in accordance with a respective one of the test values of the feature parameter;
 (c) determining a feature weight, wherein the feature weight indicates a sensitivity of the equipment parameter of the one of the equipment models to the series of changes in the feature parameter; and
 (d) outputting the feature weight.

10. A method according to claim 1, wherein steps (a) and (b) are performed for each of the equipment models, one after the other.

11. A method according to claim 1, wherein each equipment parameter models a parameter of a respective equipment of an aircraft.

12. A method according to claim 1, wherein outputting comprises displaying.

13. A test bench configured to test a system model by a method according to claim 1.

* * * * *

UNITED STATES PATENT AND TRADEMARK OFFICE
CERTIFICATE OF CORRECTION

PATENT NO. : 11,816,024 B2
APPLICATION NO. : 17/586913
DATED : November 14, 2023
INVENTOR(S) : Louis-Emmanuel Romana et al.

Page 1 of 1

It is certified that error appears in the above-identified patent and that said Letters Patent is hereby corrected as shown below:

On the Title Page

Please add the second Assignee as shown below:
(73) Assignees: AIRBUS OPERATIONS LIMITED, Bristol (GB)
       AIRBUS OPERATIONS (S.A.S.), Toulouse (FR)

Signed and Sealed this
Twenty-first Day of January, 2025

Coke Morgan Stewart
*Acting Director of the United States Patent and Trademark Office*